(12) United States Patent
Fisher

(10) Patent No.: US 11,097,781 B2
(45) Date of Patent: Aug. 24, 2021

(54) TRANSPORTATION TRAILER WITH SPACE FRAME

(71) Applicant: Halliburton Energy Services, Inc., Houston, TX (US)

(72) Inventor: Chad Adam Fisher, Cache, OK (US)

(73) Assignee: Halliburton Energy Services, Inc., Houston, TX (US)

( * ) Notice: Subject to any disclaimer, the term of this patent is extended or adjusted under 35 U.S.C. 154(b) by 272 days.

(21) Appl. No.: 16/342,788

(22) PCT Filed: Dec. 2, 2016

(86) PCT No.: PCT/US2016/064674
§ 371 (c)(1),
(2) Date: Apr. 17, 2019

(87) PCT Pub. No.: WO2018/101959
PCT Pub. Date: Jun. 7, 2018

(65) Prior Publication Data
US 2020/0055548 A1     Feb. 20, 2020

(51) Int. Cl.
*B62D 21/20* (2006.01)
*B62D 63/06* (2006.01)
(Continued)

(52) U.S. Cl.
CPC ............. *B62D 23/005* (2013.01); *B60D 1/00* (2013.01); *B60P 7/06* (2013.01); *B62D 21/20* (2013.01); *B62D 63/06* (2013.01)

(58) Field of Classification Search
CPC ...... B62D 23/005; B62D 21/20; B62D 63/06; B62D 63/062; B60P 7/06; B60P 7/08
See application file for complete search history.

(56) References Cited

U.S. PATENT DOCUMENTS

| 710,611 A | 10/1902 | Ray |
| 802,254 A | 10/1905 | Baker et al. |

(Continued)

FOREIGN PATENT DOCUMENTS

| EP | 0010985 A1 | 5/1980 |
| EP | 2937826 A1 | 10/2015 |

(Continued)

OTHER PUBLICATIONS

International Search Report and Written Opinion issued in related PCT Application No. PCT/US2016/064674 dated Aug. 16, 2017, 17 pages.

*Primary Examiner* — Minnah L Seoh
*Assistant Examiner* — Michael R Stabley
(74) *Attorney, Agent, or Firm* — John Wustenberg; Baker Botts L.L.P.

(57) ABSTRACT

Systems and methods for transporting small, dense cargo over roadways via a specialized transportation trailer are provided. The disclosed transportation trailer includes a space frame including a lower central portion designed to directly receive and support the cargo that is being carried by the trailer, as well as an upper portion that extends above the height of the cargo. The space frame also includes lower side portions that extend longitudinally in opposite directions from the lower central portion to connect the space frame to the wheels and trailer hookup of the transportation trailer. The space frame may further include a truss structure formed between the lower central portion and the upper portion to increase the rigidity of the trailer. The transportation trailer is designed to minimize the height of the cargo's center of gravity, increase trailer rigidity, increase cargo capacity, and maximize ground clearance compared to existing trailer designs.

20 Claims, 4 Drawing Sheets

(51) Int. Cl.
  *B62D 23/00*    (2006.01)
  *B60D 1/00*     (2006.01)
  *B60P 7/06*     (2006.01)

(56) References Cited

U.S. PATENT DOCUMENTS

| | | | |
|---|---|---|---|
| 917,646 A | 4/1909 | Otto | |
| 1,519,153 A | 12/1924 | Mitton | |
| 1,726,603 A | 9/1929 | Allen | |
| 1,795,987 A | 3/1931 | Henry | |
| 2,231,911 A | 2/1941 | Hitt et al. | |
| 2,281,497 A | 4/1942 | Hyson et al. | |
| 2,385,245 A | 9/1945 | Willoughby | |
| 2,415,782 A | 2/1947 | Zademach et al. | |
| 2,513,012 A | 6/1950 | Dugas | |
| 2,563,470 A | 8/1951 | Kane | |
| 2,652,174 A | 9/1953 | Shea | |
| 2,670,866 A | 3/1954 | Glesby | |
| 2,678,737 A | 5/1954 | Mangrum | |
| 2,759,737 A * | 8/1956 | Manning | B62D 53/062 |
| | | | 280/2 |
| 2,802,603 A | 8/1957 | McCray | |
| 2,867,336 A | 1/1959 | Coody et al. | |
| 3,049,248 A | 8/1962 | Heltzel et al. | |
| 3,083,879 A | 4/1963 | Coleman | |
| 3,151,779 A | 10/1964 | Rensch et al. | |
| 3,203,370 A | 8/1965 | Friedrich et al. | |
| 3,217,927 A | 11/1965 | Bale, Jr. et al. | |
| 3,318,473 A | 5/1967 | Jones et al. | |
| 3,326,572 A * | 6/1967 | Murray | B62D 53/065 |
| | | | 280/441.2 |
| 3,343,688 A | 9/1967 | Ross | |
| 3,354,918 A | 11/1967 | Coleman | |
| 3,404,963 A | 10/1968 | Fritsche et al. | |
| 3,432,151 A | 3/1969 | O'Loughlin et al. | |
| 3,467,408 A * | 9/1969 | Regalia | B60B 35/1027 |
| | | | 280/656 |
| 3,476,270 A | 11/1969 | Cox et al. | |
| 3,602,400 A | 8/1971 | Cooke | |
| 3,627,555 A | 12/1971 | Driscoll | |
| 3,675,964 A | 7/1972 | Pringle | |
| 3,698,693 A | 10/1972 | Poncet | |
| 3,785,534 A | 1/1974 | Smith | |
| 3,802,584 A | 4/1974 | Sackett, Sr. et al. | |
| 3,986,708 A | 10/1976 | Heltzel et al. | |
| 4,023,719 A | 5/1977 | Noyon | |
| 4,058,239 A | 11/1977 | Van Mill | |
| 4,138,163 A | 2/1979 | Calvert et al. | |
| 4,178,117 A | 12/1979 | Brugler | |
| 4,204,773 A | 5/1980 | Bates | |
| 4,230,360 A | 10/1980 | Eisenman | |
| 4,248,337 A | 2/1981 | Zimmer | |
| 4,258,953 A | 3/1981 | Johnson | |
| 4,313,708 A | 2/1982 | Tiliakos | |
| 4,395,052 A * | 7/1983 | Rash | B60P 3/2215 |
| | | | 250/506.1 |
| 4,398,653 A | 8/1983 | Daloisio | |
| 4,423,884 A * | 1/1984 | Gevers | B62D 53/067 |
| | | | 280/407.1 |
| 4,544,279 A | 10/1985 | Rudolph | |
| 4,548,507 A | 10/1985 | Mathis et al. | |
| 4,583,663 A | 4/1986 | Bonerb | |
| 4,626,166 A | 12/1986 | Jolly | |
| 4,701,095 A | 10/1987 | Berryman et al. | |
| 4,806,065 A * | 2/1989 | Holt | B62D 53/065 |
| | | | 280/425.2 |
| 4,850,702 A | 7/1989 | Arribau et al. | |
| 4,856,681 A | 8/1989 | Murray | |
| 4,900,157 A | 2/1990 | Stegemoeller et al. | |
| 4,919,540 A | 4/1990 | Stegemoeller et al. | |
| 4,956,821 A | 9/1990 | Fenelon | |
| 4,993,883 A | 2/1991 | Jones | |
| 4,997,335 A * | 3/1991 | Prince | B60P 1/02 |
| | | | 105/370 |
| 5,036,979 A | 8/1991 | Selz | |
| 5,092,721 A | 3/1992 | Prince | |
| 5,096,096 A | 3/1992 | Calaunan | |
| 5,114,169 A * | 5/1992 | Botkin | B62D 53/061 |
| | | | 280/400 |
| 5,149,192 A | 9/1992 | Hamm et al. | |
| 5,303,998 A | 4/1994 | Whitlatch et al. | |
| 5,339,996 A | 8/1994 | Dubbert et al. | |
| 5,343,813 A * | 9/1994 | Septer | B60P 3/035 |
| | | | 105/355 |
| 5,375,730 A | 12/1994 | Bahr et al. | |
| 5,401,129 A * | 3/1995 | Eatinger | B60P 7/12 |
| | | | 410/49 |
| 5,413,154 A | 5/1995 | Hurst, Jr. et al. | |
| 5,426,137 A | 6/1995 | Allen | |
| 5,441,321 A | 8/1995 | Karpisek | |
| 5,443,350 A * | 8/1995 | Wilson | B60P 1/02 |
| | | | 410/14 |
| 5,445,289 A | 8/1995 | Owen | |
| 5,590,976 A | 1/1997 | Kilheffer et al. | |
| 5,722,552 A | 3/1998 | Olson | |
| 5,772,390 A | 6/1998 | Walker | |
| 5,806,441 A | 9/1998 | Chung | |
| 5,913,459 A | 6/1999 | Gill et al. | |
| 5,915,913 A * | 6/1999 | Greenlaw | B60P 1/02 |
| | | | 414/679 |
| 5,927,356 A | 7/1999 | Henderson | |
| 5,944,470 A | 8/1999 | Bonerb | |
| 5,997,099 A | 12/1999 | Collins | |
| 6,059,372 A | 5/2000 | McDonald et al. | |
| 6,112,946 A | 9/2000 | Bennett et al. | |
| 6,126,307 A | 10/2000 | Black et al. | |
| 6,193,402 B1 | 2/2001 | Grimland et al. | |
| 6,247,594 B1 | 6/2001 | Garton | |
| 6,379,086 B1 | 4/2002 | Goth | |
| 6,425,627 B1 * | 7/2002 | Gee | B62D 53/062 |
| | | | 280/789 |
| 6,491,421 B2 | 12/2002 | Rondeau et al. | |
| 6,497,541 B2 | 12/2002 | Pawluk | |
| 6,517,232 B1 | 2/2003 | Blue | |
| 6,536,939 B1 | 3/2003 | Blue | |
| 6,537,015 B2 | 3/2003 | Lim et al. | |
| 6,568,567 B2 | 5/2003 | McKenzie et al. | |
| 6,622,849 B1 | 9/2003 | Sperling | |
| 6,655,548 B2 | 12/2003 | McClure, Jr. et al. | |
| 6,876,904 B2 | 4/2005 | Oberg et al. | |
| 6,980,914 B2 | 12/2005 | Bivens et al. | |
| 7,008,163 B2 | 3/2006 | Russell | |
| 7,086,342 B2 | 8/2006 | O'Neall et al. | |
| 7,100,896 B1 | 9/2006 | Cox | |
| 7,114,905 B2 * | 10/2006 | Dibdin | B60P 1/02 |
| | | | 414/495 |
| 7,252,309 B2 | 8/2007 | Eng Soon et al. | |
| 7,284,579 B2 | 10/2007 | Elgan | |
| 7,451,015 B2 | 11/2008 | Mazur et al. | |
| 7,475,796 B2 | 1/2009 | Garton | |
| 7,500,817 B2 | 3/2009 | Furrer et al. | |
| 7,513,280 B2 | 4/2009 | Brashears et al. | |
| 7,665,788 B2 * | 2/2010 | Dibdin | B60P 1/38 |
| | | | 296/25 |
| 7,762,281 B2 | 7/2010 | Schuld | |
| 7,997,213 B1 | 8/2011 | Gauthier et al. | |
| 8,376,385 B2 | 2/2013 | Shannon | |
| 8,387,824 B2 | 3/2013 | Wietgrefe | |
| 8,434,778 B2 | 5/2013 | Ehrlich et al. | |
| 8,434,990 B2 | 5/2013 | Claussen | |
| D688,349 S | 8/2013 | Oren et al. | |
| D688,350 S | 8/2013 | Oren et al. | |
| D688,351 S | 8/2013 | Oren et al. | |
| D688,772 S | 8/2013 | Oren et al. | |
| 8,505,780 B2 | 8/2013 | Oren | |
| 8,545,148 B2 | 10/2013 | Wanek-Pusset et al. | |
| 8,573,917 B2 | 11/2013 | Renyer | |
| 8,585,341 B1 | 11/2013 | Oren | |
| 8,607,289 B2 | 12/2013 | Brown et al. | |
| 8,616,370 B2 | 12/2013 | Allegretti et al. | |
| 8,622,251 B2 | 1/2014 | Oren | |
| 8,662,525 B1 * | 3/2014 | Dierks | B62D 21/14 |
| | | | 280/656 |

(56) References Cited

U.S. PATENT DOCUMENTS

| | | | |
|---|---|---|---|
| 8,668,430 B2 | 3/2014 | Oren et al. |
| D703,582 S | 4/2014 | Oren |
| 8,827,118 B2 | 9/2014 | Oren |
| 8,834,012 B2 | 9/2014 | Case et al. |
| 8,887,914 B2 | 11/2014 | Allegretti et al. |
| RE45,713 E | 10/2015 | Oren et al. |
| 9,162,603 B2 | 10/2015 | Oren |
| RE45,788 E | 11/2015 | Oren et al. |
| 9,211,830 B1 | 12/2015 | Hensley et al. |
| 9,248,772 B2 | 2/2016 | Oren |
| RE45,914 E | 3/2016 | Oren et al. |
| 9,296,518 B2 | 3/2016 | Oren |
| 9,340,353 B2 | 5/2016 | Oren et al. |
| 9,358,916 B2 | 6/2016 | Oren |
| 9,394,102 B2 | 7/2016 | Oren et al. |
| 9,403,626 B2 | 8/2016 | Oren |
| 9,421,899 B2 | 8/2016 | Oren |
| 9,440,785 B2 | 9/2016 | Oren et al. |
| 9,446,801 B1 | 9/2016 | Oren |
| 9,475,661 B2 | 10/2016 | Oren |
| 9,511,929 B2 | 12/2016 | Oren |
| 9,522,816 B2 | 12/2016 | Taylor |
| 9,527,664 B2 | 12/2016 | Oren |
| 9,580,238 B2 | 2/2017 | Friesen et al. |
| RE46,334 E | 3/2017 | Oren et al. |
| 9,617,065 B2 | 4/2017 | Allegretti et al. |
| 9,617,066 B2 | 4/2017 | Oren |
| 9,624,030 B2 | 4/2017 | Oren et al. |
| 9,624,036 B2 | 4/2017 | Luharuka et al. |
| 9,643,774 B2 | 5/2017 | Oren |
| 9,650,216 B2 | 5/2017 | Allegretti |
| 9,656,799 B2 | 5/2017 | Oren et al. |
| 9,669,993 B2 | 6/2017 | Oren et al. |
| 9,670,752 B2 | 6/2017 | Glynn et al. |
| 9,676,554 B2 | 6/2017 | Glynn et al. |
| 9,682,815 B2 | 6/2017 | Oren |
| 9,694,970 B2 | 7/2017 | Oren et al. |
| 9,701,463 B2 | 7/2017 | Oren et al. |
| 9,718,609 B2 | 8/2017 | Oren et al. |
| 9,718,610 B2 | 8/2017 | Oren |
| 9,725,233 B2 | 8/2017 | Oren et al. |
| 9,725,234 B2 | 8/2017 | Oren et al. |
| 9,738,439 B2 | 8/2017 | Oren et al. |
| RE46,531 E | 9/2017 | Oren et al. |
| 9,758,081 B2 | 9/2017 | Oren |
| 9,758,993 B1 | 9/2017 | Allegretti et al. |
| 9,771,224 B2 | 9/2017 | Oren et al. |
| 9,783,338 B1 | 10/2017 | Allegretti et al. |
| 9,796,319 B1* | 10/2017 | Oren ............... B60P 3/00 |
| 9,796,504 B1 | 10/2017 | Allegretti et al. |
| 9,809,381 B2 | 11/2017 | Oren et al. |
| 9,828,135 B2 | 11/2017 | Allegretti et al. |
| 9,840,366 B2 | 12/2017 | Oren et al. |
| 9,969,564 B2* | 5/2018 | Oren ............... B65G 65/42 |
| 9,988,182 B2 | 6/2018 | Allegretti et al. |
| 10,059,246 B1* | 8/2018 | Oren ............... B62D 21/20 |
| 10,081,993 B2 | 9/2018 | Walker et al. |
| 10,189,599 B2 | 1/2019 | Allegretti et al. |
| 10,207,753 B2* | 2/2019 | O'Marra ............... B60P 1/4421 |
| 10,287,091 B2 | 5/2019 | Allegretti |
| 10,308,421 B2 | 6/2019 | Allegretti |
| 10,486,854 B2 | 11/2019 | Allegretti et al. |
| 10,518,828 B2* | 12/2019 | Oren ............... B62D 33/02 |
| 10,604,338 B2 | 3/2020 | Allegretti |
| 2002/0121464 A1 | 9/2002 | Soldwish-Zoole et al. |
| 2003/0159310 A1 | 8/2003 | Hensley et al. |
| 2004/0008571 A1 | 1/2004 | Coody et al. |
| 2004/0009050 A1 | 1/2004 | Rediehs |
| 2004/0031335 A1 | 2/2004 | Fromme et al. |
| 2004/0206646 A1 | 10/2004 | Goh et al. |
| 2004/0258508 A1 | 12/2004 | Jewell |
| 2005/0219941 A1 | 10/2005 | Christenson et al. |
| 2006/0013061 A1 | 1/2006 | Bivens et al. |
| 2007/0014185 A1 | 1/2007 | Diosse et al. |
| 2007/0065261 A1 | 3/2007 | Chambers et al. |
| 2007/0201305 A1 | 8/2007 | Heilman et al. |
| 2008/0187423 A1 | 8/2008 | Mauchle |
| 2008/0294484 A1 | 11/2008 | Furman et al. |
| 2009/0078410 A1 | 3/2009 | Krenek et al. |
| 2009/0129903 A1 | 5/2009 | Lyons, III |
| 2009/0292572 A1 | 11/2009 | Alden et al. |
| 2009/0297306 A1 | 12/2009 | Cook |
| 2009/0314791 A1 | 12/2009 | Hartley et al. |
| 2010/0319921 A1 | 12/2010 | Eia et al. |
| 2012/0017812 A1 | 1/2012 | Renyer et al. |
| 2012/0018093 A1 | 1/2012 | Zuniga et al. |
| 2012/0037231 A1 | 2/2012 | Janson |
| 2012/0181093 A1 | 7/2012 | Fehr et al. |
| 2012/0219391 A1 | 8/2012 | Teichrob et al. |
| 2013/0135958 A1 | 5/2013 | O'Callaghan |
| 2013/0142601 A1 | 6/2013 | McIver et al. |
| 2013/0206415 A1 | 8/2013 | Sheesley |
| 2013/0284729 A1 | 10/2013 | Cook et al. |
| 2014/0023463 A1 | 1/2014 | Oren |
| 2014/0044508 A1 | 2/2014 | Luharuka et al. |
| 2014/0083554 A1 | 3/2014 | Harris |
| 2014/0216736 A1 | 8/2014 | Leugemors et al. |
| 2014/0305769 A1 | 10/2014 | Eiden, III et al. |
| 2014/0377042 A1 | 12/2014 | McMahon |
| 2015/0003955 A1 | 1/2015 | Oren et al. |
| 2015/0016209 A1 | 1/2015 | Barton et al. |
| 2015/0183578 A9 | 7/2015 | Oren et al. |
| 2015/0191318 A1 | 7/2015 | Martel |
| 2015/0284194 A1 | 10/2015 | Oren et al. |
| 2015/0353293 A1 | 12/2015 | Richard |
| 2015/0366405 A1 | 12/2015 | Manchuliantsau |
| 2015/0368052 A1 | 12/2015 | Sheesley |
| 2015/0375930 A1 | 12/2015 | Oren et al. |
| 2016/0031658 A1 | 2/2016 | Oren et al. |
| 2016/0039433 A1 | 2/2016 | Oren et al. |
| 2016/0046438 A1 | 2/2016 | Oren et al. |
| 2016/0046454 A1 | 2/2016 | Oren et al. |
| 2016/0068342 A1 | 3/2016 | Oren et al. |
| 2016/0090741 A1 | 3/2016 | Jobin et al. |
| 2016/0130095 A1 | 5/2016 | Oren et al. |
| 2016/0244279 A1 | 8/2016 | Oren et al. |
| 2016/0264352 A1 | 9/2016 | Oren |
| 2016/0332809 A1 | 11/2016 | Harris |
| 2016/0332811 A1 | 11/2016 | Harris |
| 2017/0021318 A1 | 1/2017 | McIver et al. |
| 2017/0129696 A1 | 5/2017 | Oren |
| 2017/0144834 A1 | 5/2017 | Oren et al. |
| 2017/0190523 A1 | 7/2017 | Oren et al. |
| 2017/0203915 A1 | 7/2017 | Oren |
| 2017/0217353 A1* | 8/2017 | Vander Pol ............ B62D 33/02 |
| 2017/0217671 A1 | 8/2017 | Allegretti |
| 2017/0225883 A1 | 8/2017 | Oren |
| 2017/0240350 A1 | 8/2017 | Oren et al. |
| 2017/0240361 A1 | 8/2017 | Glynn et al. |
| 2017/0240363 A1 | 8/2017 | Oren |
| 2017/0267151 A1 | 9/2017 | Oren |
| 2017/0283165 A1 | 10/2017 | Oren et al. |
| 2017/0313497 A1 | 11/2017 | Schaffner et al. |
| 2017/0320660 A1 | 11/2017 | Sanders et al. |
| 2017/0349226 A1* | 12/2017 | Oren ............... B62D 21/02 |
| 2018/0002120 A1 | 1/2018 | Allegretti et al. |
| 2018/0257814 A1 | 9/2018 | Allegretti et al. |
| 2019/0009231 A1 | 1/2019 | Warren et al. |
| 2019/0111401 A1 | 4/2019 | Lucas et al. |
| 2019/0241356 A1 | 8/2019 | Schaffner et al. |
| 2020/0062448 A1 | 2/2020 | Allegretti et al. |

FOREIGN PATENT DOCUMENTS

| | | |
|---|---|---|
| GB | 795852 A | 5/1958 |
| GB | 2066220 A | 7/1981 |
| GB | 2204847 A1 | 11/1988 |
| JP | 2008239019 A | 10/2008 |
| WO | 2008012513 A2 | 1/2008 |
| WO | 2013095871 A1 | 6/2013 |
| WO | 2013142421 A1 | 9/2013 |
| WO | 2014018129 A1 | 1/2014 |
| WO | 2014018236 A2 | 5/2014 |
| WO | 2015119799 A1 | 8/2015 |

(56) References Cited

FOREIGN PATENT DOCUMENTS

| | | |
|---|---|---|
| WO | 2015191150 A1 | 12/2015 |
| WO | 2015192061 A1 | 12/2015 |
| WO | 2016044012 A1 | 3/2016 |
| WO | 2016160067 A1 | 10/2016 |
| WO | 2016178691 A1 | 11/2016 |
| WO | 2016178692 A1 | 11/2016 |
| WO | 2016178694 A1 | 11/2016 |
| WO | 2016178695 A1 | 11/2016 |
| WO | 2017014768 A1 | 1/2017 |
| WO | 2017014771 A1 | 1/2017 |
| WO | 2017014774 A1 | 1/2017 |
| WO | 2017027034 A1 | 2/2017 |

* cited by examiner

TRANSPORTATION TRAILER WITH SPACE FRAME

CROSS-REFERENCE TO RELATED APPLICATION

The present application is a U.S. National Stage Application of International Application No. PCT/US2016/064674 filed Dec. 2, 2016, which is incorporated herein by reference in its entirety for all purposes.

TECHNICAL FIELD

The present disclosure relates generally to a transportation trailer, and more particularly, to a transportation trailer having a space frame to improve the ability of the transportation trailer to handle small, dense loads.

BACKGROUND

Transportation trailers have been widely used to transport a variety of types of cargo along roadways. Many such trailers are designed to provide ultimate adaptability to the cargo and are therefore not optimized for a specific purpose. For example, double drop deck trailers are often used when a fit-for-purpose trailer is not designed for the cargo. Double drop deck trailers generally feature an elongated center section that provides a deck for mounting cargo thereto, this center section disposed between two elevated deck sections (one at the front for connecting the trailer to a truck and the other at the back over the wheels). In these types of trailers, the elongated center section provides a flatbed that supports the cargo being carried on the trailer. These trailers are designed for extreme adaptability to a wide range of cargo while minimizing the height of the center of gravity of said cargo. Unfortunately, ground clearance is often sacrificed in favor of this adaptability to the cargo. In situations where more road clearance may be necessary, such as when transporting goods to a remote work site, standard double drop trailers may be ineffective.

Other types of transportation trailers are used to transport cargo along roadways. For example, intermodal containers are often mounted onto truck trailers to carry a variety of cargo. These intermodal containers are designed to be adaptable to various types of freight transport (e.g., rail, ship, and truck). The increased length of these containers decreases the bending load on the trailer while still meeting axle spread bridge laws, thereby allowing a light weight rail frame design for the trailer. However, since the containers are unloaded off the trailer from the rear, the doors are located above the axles of the trailer. This increases the center of gravity height of the cargo compared to that of drop deck trailers, reducing the stability of the load.

It is now recognized that a need exists for a trailer design that is adapted specifically to carrying dense loads along roadways with increased road clearance, reduced center of gravity height of the load, and increased stability of the trailer.

BRIEF DESCRIPTION OF THE DRAWINGS

For a more complete understanding of the present disclosure and its features and advantages, reference is now made to the following description, taken in conjunction with the accompanying drawings, in which.

DETAILED DESCRIPTION

Figure 1:
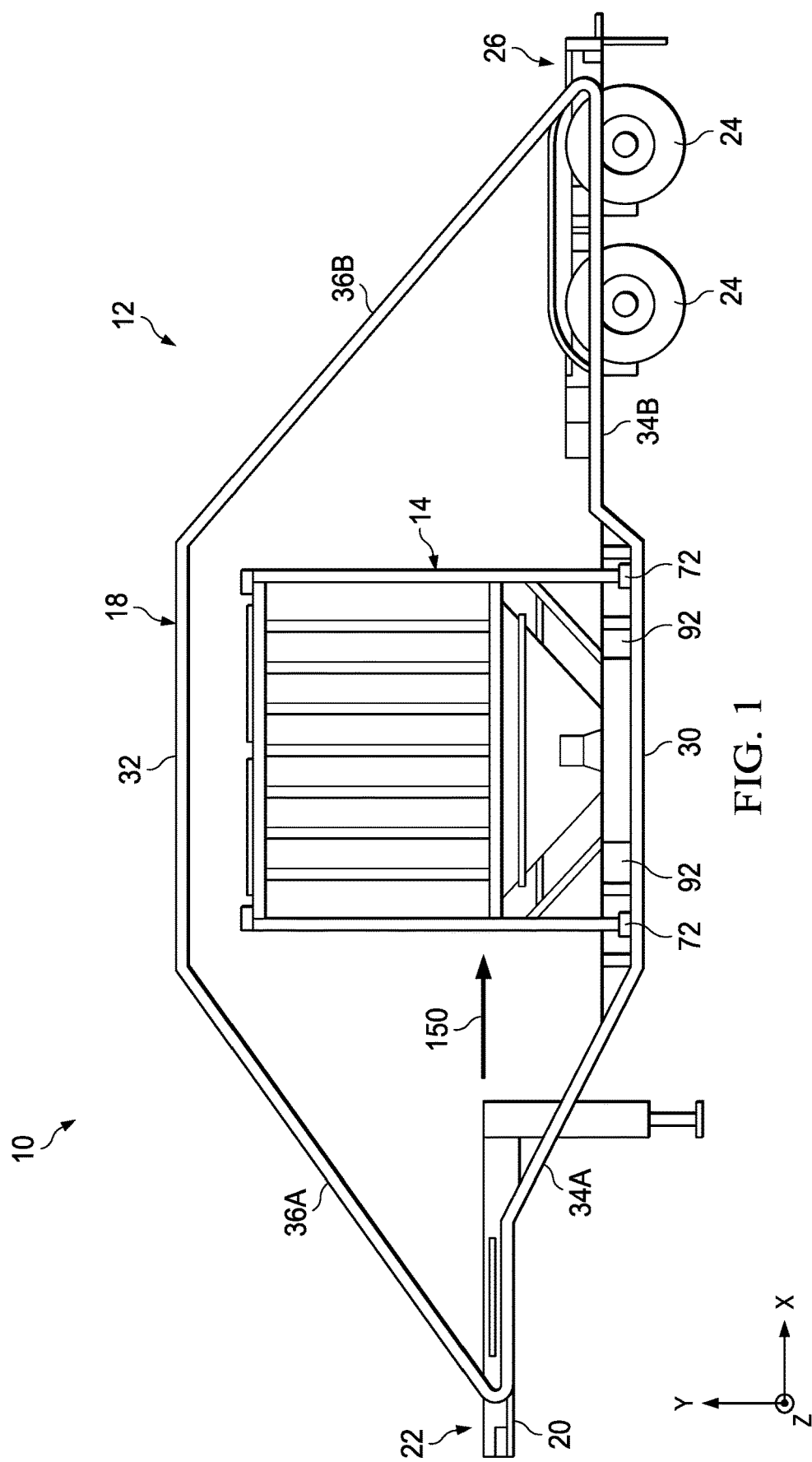
FIG. 1 is a side view of a transportation trailer with a space frame for carrying a container, in accordance with an embodiment of the present disclosure.

Illustrative embodiments of the present disclosure are described in detail herein. In the interest of clarity, not all features of an actual implementation are described in this specification. It will of course be appreciated that in the development of any such actual embodiment, numerous implementation specific decisions must be made to achieve developers' specific goals, such as compliance with system related and business related constraints, which will vary from one implementation to another. Moreover, it will be appreciated that such a development effort might be complex and time consuming, but would nevertheless be a routine undertaking for those of ordinary skill in the art having the benefit of the present disclosure. Furthermore, in no way should the following examples be read to limit, or define, the scope of the disclosure.

Certain embodiments according to the present disclosure may be directed to systems and methods for transporting small, dense cargo over roadways via a specialized transportation trailer. The disclosed transportation trailer is specifically designed to match the cargo being transported. The transportation trailer is designed to minimize the height of the cargo's center of gravity, increase trailer rigidity, increase cargo capacity, and maximize ground clearance compared to existing trailer designs. The transportation trailer design may be particularly useful for transporting containers of bulk material, which may be used in a wide variety of contexts including, but not limited to, drilling and completion of oil and gas wells, concrete mixing applications, agriculture, and others.

In an existing transportation trailer designed to carry a container of bulk material, the trailer structure passes entirely below the load (i.e., container) being carried. Such trailers may be fit-for-purpose, meaning they are designed to carry a specific type of load. For example, the trailer generally includes a conventional twin rail design with support arms extending outward from the main rails of the trailer to support the container of bulk material. Since the trailer uses a twin rail design without the deck, the weight of the trailer is reduced compared to a drop deck type trailer, allowing a heavier payload to be hauled by the trailer. However, the structure of the trailer is disposed entirely underneath the load, which makes the center of gravity of the load relatively high and increases a likelihood of accidental Jailer rollover. Additionally, the twin rail design, while offering trailer flexibility, also contributes to instability of the trailer during transportation along roadways.

The disclosed systems and methods for transporting small, dense loads (e.g., bulk material container) may eliminate the shortcomings associated with existing conventional twin rail fit-for-purpose trailers. Specifically, the disclosed systems and methods are directed to a transportation trailer that includes a specially designed space frame. The space frame includes a lower central portion that is designed to directly receive and support the cargo that is being carried by the trailer, as well as an upper portion that extends above the height of the cargo. The space frame also includes lower side portions that extend longitudinally in opposite directions from the lower central portion to connect the space frame to the wheels and trailer hookup of the transportation trailer. The space frame may further include a truss structure formed between the lower central portion, the lower side portions, and the upper portion to increase the rigidity of the trailer.

The disclosed transportation trailer with the space frame may minimize the height of the center of gravity of the trailer and cargo while increasing the rigidity of the trailer. This may reduce the occurrence or likelihood of trailer rollover during transport. The disclosed transportation trailer design may also maximize the cargo capacity of the trailer, so that bulk material or other types of cargo may be transported more efficiently to a location using the transportation trailer.

Turning now to the drawings, FIG. 1 is a side view of a system 10 including a transportation trailer 12 and a cargo element 14 disposed on the transportation trailer 12, in accordance with embodiments of the present disclosure. In the illustrated embodiment, the cargo element 14 may be a container holding an amount of bulk material to be delivered to a location. In other embodiments, the cargo element 14 may be any other desirable type of cargo to be transported to a location on the transportation trailer 12. Although illustrated as carrying a single cargo element 14, the trailer 12 may also be used to transport two or more separate cargo elements 14, which may be stacked one over another or side by side.

The transportation trailer 12 may be specifically designed for use with a particular size and/or type of cargo element 14 that is disposed thereon. In some embodiments, the transportation trailer 12 may be designed to transport a cargo element 14 that includes a single, dense, and relatively small load, such as the illustrated bulk material container. In other embodiments, however, the transportation trailer 12 may be designed to transport more than one cargo element 14 at the same time.

The disclosed transportation trailer 12 may include a specially designed space frame 18 for supporting the cargo element 14. As illustrated, the space frame 18 may extend longitudinally along the trailer 12 and may be connected to other components of the trailer 12. For example, the trailer 12 may include a trailer hookup 20 disposed at a first end 22 of the trailer 12. The trailer 12 may also include a plurality of wheels 24 disposed at a second end 26 of the trailer 12 opposite the first end 22. The trailer hookup 20 may be used to attach the trailer 12 to a truck that is pulling the trailer 12. The space frame 18 may include a lower central portion 30 and an upper portion 32 extending upward from the lower central portion 30. The upper portion 32 of the space frame 18 may extend above the maximum height of the cargo element 14 disposed on the trailer 12. The space frame 18 may include extended lower side portions 34A and 34B that are coupled to and extend longitudinally outward from the lower central portion 30 on both sides of the space frame 18. The lower side portion 34A may form the first end 22 of the trailer 12 that is coupled to the trailer hookup 20. The lower side portion 34B may form the second end 26 of the trailer 12 that is coupled to the plurality of wheels 24.

As illustrated, the lower side portions 34A and 34B of the space frame 18 may be elevated compared to the lower central portion 30 of the space frame 18 to account for the positioning of the trailer hookup 20 and the wheels 24. The lower central portion 30 may drop down slightly below the lower side portions 34A and 34B. That is, the lower central portion 30 may drop down below an upper surface of the lower side portions 34A and 34B. As such, the cargo element 14 may be received on and supported by the lower central portion 30 at a lower position than the upper surfaces of the lower side portions 34A and 34B on either side.

The space frame 18 may include downwardly sloping portions 36A and 36B coupled to opposite sides of the upper portion 32 and sloping downwardly and in opposite directions away from the upper portion 32 to connect the upper portion 32 to the lower side portions 34A and 34B, respectively. With these sloping portions 36A and 36B, the space frame 18 generally takes the shape of a trapezoid when viewed from the side as in FIG. 1. The generally trapezoidal shape of the space frame 18 takes advantage of the strength available through a triangular shape to facilitate a relatively lightweight and high strength space frame 18. Thus, the space frame 18 may be constructed from less material than a differently shaped (e.g., rectangular) space frame used to support the same amount of cargo.

Figure 2:
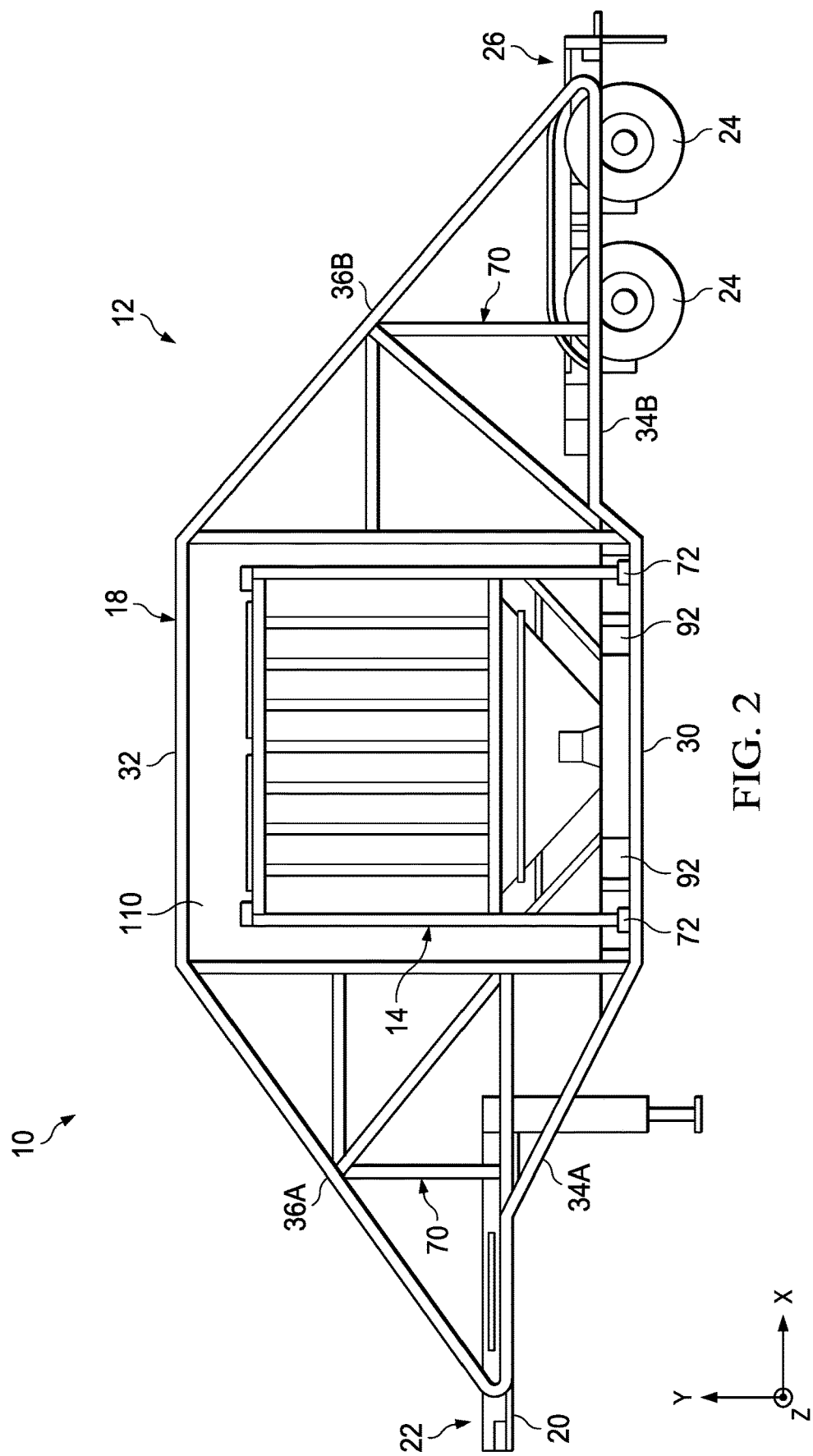
FIG. 2 is a side view of another transportation trailer with a space frame for carrying a container, in accordance with an embodiment of the present disclosure.
Figure 3:
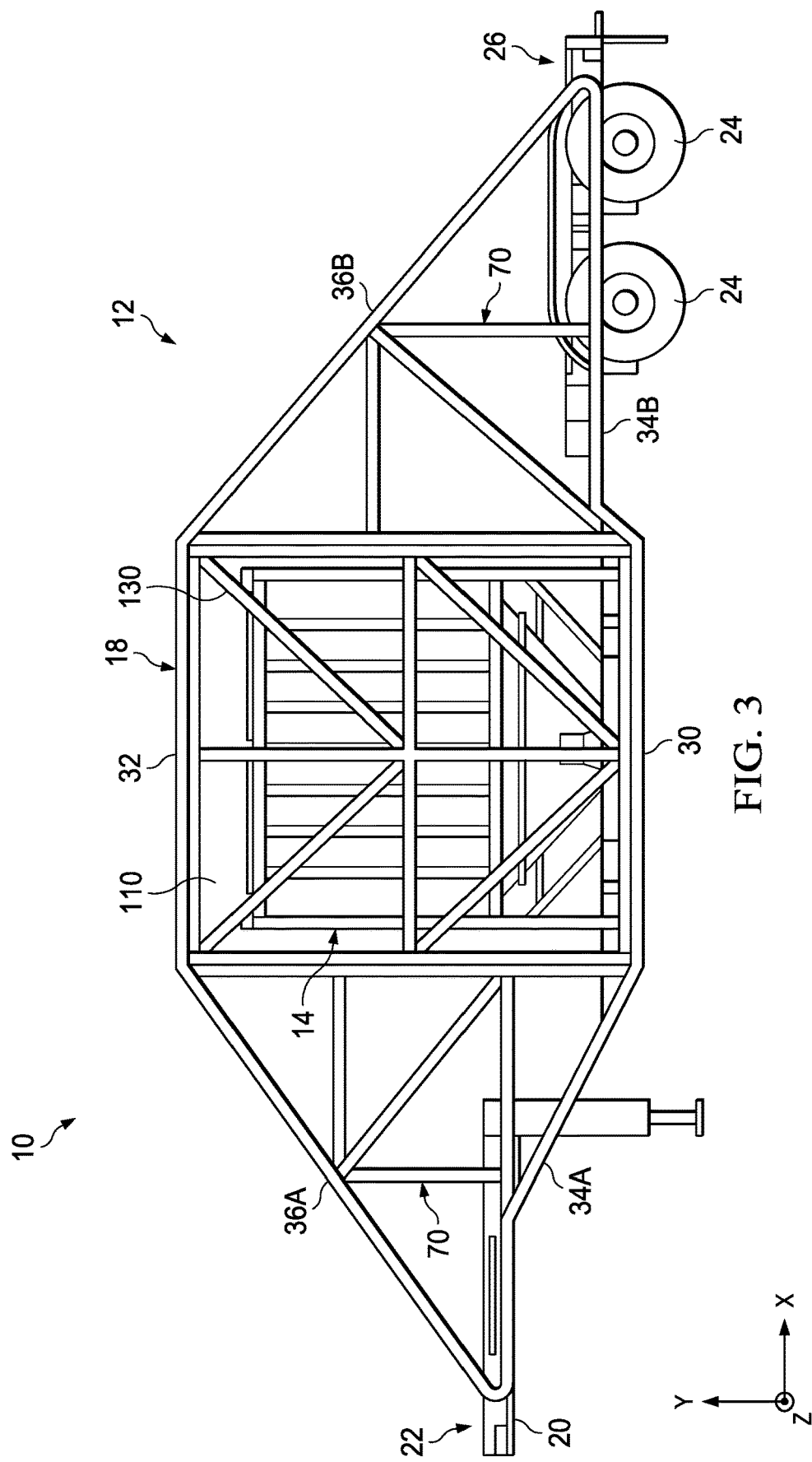
FIG. 3 is a side view of another transportation trailer with a space frame for carrying a container, in accordance with an embodiment of the present disclosure.
Figure 4:
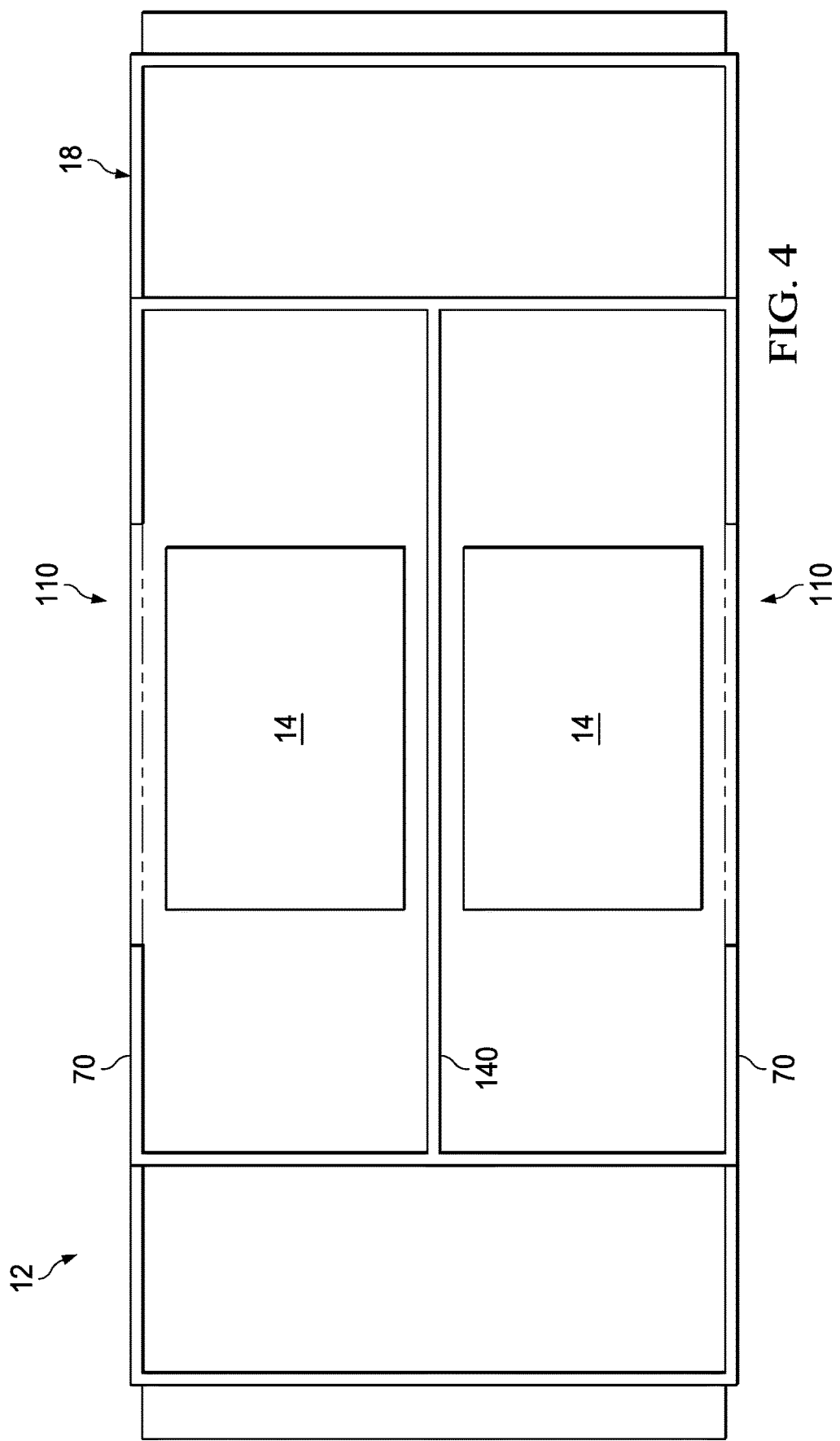
FIG. 4 is a top cutaway view of another transportation trailer with a space frame for carrying two containers, in accordance with an embodiment of the present disclosure.

As illustrated in FIGS. 2-4, the space frame 18 may also include an array of truss structures 70 (i.e., truss work) coupled between the lower central portion 30, the extended lower side portions 34, the upper portion 32, and/or the downwardly sloping portions 36 of the space frame 18. The truss structures 70 of the space frame 18 may work together like a truss bridge to provide stability and rigidity to the space frame 18. The truss structures 70 may be arranged in a triangular pattern between the upper portion 32, the lower central portion 30, the extended lower side portions 34A and 34B, and the sloping portions 36A and 36B to distribute various forces that are imparted on the space frame 18 during transportation of the trailer 12 along a road.

The space frame 18 may be constructed entirely from mild steels or aluminum. The various parts of the space frame 18 (e.g., 30, 32, 34, 36, and 70) may be individual pieces that are welded together to form the full space frame 18.

The cargo element 14 may include iso corners 72 designed to interface with pins, locks, or other corresponding elements on the lower central portion 30 of the space frame 18 of the trailer 12. In some embodiments, the trailer 12 may include a locking assembly on the lower central portion 30 of the space frame 18 to lock the cargo element 14 into a desired position on the trailer 12. For example, the trailer 12 may include a plurality of locks (not shown) disposed on the lower central portion 30 to interface with the cargo element 14 (e.g., at the iso corners 72). The cargo element 14 may be placed on the lower central portion 30 of the space frame 18 of the trailer 12 and secured at each corner to the trailer 12 via the locks. The locks may include iso-twist locks that can be easily manipulated to secure the cargo element 14 to the trailer 12. However, other types of twist locks of other mechanically actuated locks may be used in other embodiments of the trailer 12.

The trailer 12 may be designed such that the cargo element 14 can be loaded onto and unloaded from the trailer 12 from one or both sides of the trailer 12. The term "side" refers to an edge or boundary of the trailer 12 along the trailer's width dimension (Z-axis) perpendicular to a longitudinal dimension (X-axis) of the trailer 12. As shown in FIG. 1, the upper portion 32 of the space frame 18 may be positioned such that a space is present between the upper portion 32 and the top of the cargo element 14 when the cargo element 14 is positioned on the trailer 12. That way, the cargo element 14 can be lifted slightly relative to the lower central portion 30 of the space frame 18 to facilitate loading and unloading of the cargo element 14.

As illustrated in FIG. 1, the cargo element 14 may include forklift pockets 92 on at least one side, and these forklift pockets 92 may be engaged by a forklift or similar hoisting mechanism to facilitate lifting and transportation of the cargo element 14 about a location. For example, at a loading station a forklift may engage the cargo element 14 via the forklift pockets 92 and lift the cargo element 14 onto the trailer 12 from the side. Once the trailer 12 arrives at a destination for unloading, another forklift may approach the trailer 12 from the side, engage the cargo element 14 via the forklift pockets 92, and remove the cargo element from the trailer 12.

As illustrated in FIG. 2, when the space frame 18 includes the truss structures 70 for increased stability, the space frame 18 may be constructed with an opening 110 on one or both sides of the trailer 12 through which the cargo element 14 may be loaded and unloaded. The opening 110 may be generally rectangular and slightly larger in dimensions than the cargo element 14 to facilitate placement of the cargo element 14 through the opening 110. In some embodiments, the opening 110 in the space frame 18 may be disposed on just one side of the trailer 12. This provides increased trailer rigidity compared to a trailer 12 with two openings 110, and there is less time and effort involved in removing the cargo element 14. However, the trailer 12 would need to be unloaded from a fixed side.

In other embodiments, the space frame 18 of the trailer 12 may include two openings 110, one on each side of the trailer 12 along the width dimension, enabling loading and unloading of the cargo element 14 from either side of the trailer 12. Having two openings 110 within the space frame 18 may increase the flexibility in loading/unloading the cargo element 14 from the trailer 12. This may be particularly useful when the trailer 12 is being loaded or unloaded at a crowded location where it is difficult for the trailer 12 to approach a loading/unloading area from any direction. Instead of maneuvering the trailer 12 into a specific orientation, the forklift (or other hoisting mechanism) may approach the trailer 12 from whichever side is more convenient to unload the cargo element 14 from the trailer 12.

FIG. 3 illustrates an embodiment of the trailer 12 where the space frame 18 includes a removable truss section 130 disposed over the opening 110 on one or both sides of the trailer 12. The removable truss section 130 may include one or more doors that are coupled to the truss structures 70 on the space frame 18 via one or more hinges, for example. In other instances, the removable truss section 130 may include one or more sliding doors that are designed to slide along rails out of the way of the opening 110 when loading/unloading operations are taking place. In still other instances, the removable truss section 130 may be completely removable from the other truss structures 70 of the space frame 18. For example, the removable section 130 may be selectively disconnected from the space frame 18 and positioned on the ground or at some other storage area while loading/unloading operations are taking place. When the trailer 12 is again loaded up and/or transported from one location to another, the removable truss section 130 may be positioned over the opening 110 and secured to the rest of the space frame 18.

The removable truss section 130 may help to increase stability of the space frame 18 as the trailer 12 is traveling down a road, while easily enabling exposure of one or more openings 110 in the side of the space frame 18 for unloading/loading cargo. As described above, the space frame 18 may include openings 110 formed in one or both sides of the space frame 18. Similarly, the trailer 12 may include one or more removable truss sections 130 disposed over the corresponding openings 110 on one or both sides of the space frame 18.

FIG. 4 illustrates another example of the trailer 12 having the space frame 18. As shown, the trailer 12 may include an intermediate truss section 140 added to the center of the space frame 18. The truss section 140 may extend between the upper portion 32, the lower central portion 30, the extended lower side portions 34, and/or the downwardly sloping portions 36. As shown, the truss section 140 may be formed in a plane that is parallel to the truss structures 70 on opposing sides of the space frame 18. The truss section 140 may be constructed along the centerline between the opposite side edges of the trailer 12, generally cutting the width of the trailer 12 in half. This additional truss section 140 may provide a more balanced and stable trailer structure than would be available with just truss structures 70 disposed along the opposing sides of the trailer 12. The trailer 12 of FIG. 4 may be used to carry two cargo elements 14 that are each approximately half the width of the trailer 12. The trailer 12 may include openings 110 on both sides of the space frame 18 to facilitate removal of the cargo elements 14 from opposite sides of the trailer 12.

The disclosed trailer 12 of FIGS. 1-4 having the space frame 18 may be used to support the cargo element 14 at a position having a lower center of gravity (CG) 150 than would be available using conventional trailers. The space frame 18 lowers the CG 150 of the cargo element 14 by moving a portion of the structure of the trailer 12 above the cargo element 14. Since the overall structure of the trailer 12 (i.e., space frame 18) is spread out both below and above the cargo element 14, less material is needed to form the structure that rests underneath the cargo element 14 without sacrificing stability of the trailer 12. For example, a thickness of the lower central portion 30 of the space frame 18 that is used to directly support the cargo element 14 may be less than a thickness of the lower side portions 34A and 34B of the space frame 18 on either side of the lower central portion 30, as shown. Therefore, the cargo element 14 may be supported on the trailer 12 with a reduced cargo height and CG 150. In some embodiments, the cargo element 14 may be supported on the disclosed trailer with a cargo height and/or CG 150 that is approximately 15 inches lower than would be possible without the space frame 18 extending above the cargo element 14.

The disclosed trailer 12 having the space frame 18 may facilitate a relatively low CG of the cargo element 14 being transported on the trailer 12 while maximizing ground clearance of the trailer 12. The term ground clearance refers to the amount of space between a point where the wheels 24 of the trailer 12 touch the ground and a bottom surface of the lower central portion 30 of the trailer 12. By using the trailer 12 with the space frame 18, the same ground clearance may be maintained while reducing the CG of the cargo element 14 supported on the trailer 12 compared to a similar trailer that does not include a space frame extending above the cargo. This may be particularly useful when transporting a cargo element 14 (e.g., large container of material) off-road or on roads with varying levels of terrain where maximum ground clearance is desired.

The disclosed trailer 12 comprising the space frame 18 may be constructed within the dimension limits set by the Department of Transportation (DOT) or other relevant regulatory bodies. For example, the overall height of the trailer 12 (i.e., from the ground to the upper portion 32 of the space frame) may be limited to 13 feet, 6 inches. Since the space frame 18 enables the placement of the cargo element 14 on the trailer 12 at a lower position than would otherwise be available, a larger (e.g., taller) cargo element 14 may be positioned on the trailer 12. The drop in position at which the cargo element 14 is elevated by trailer 12 (due to the distributed space frame 18) is generally greater than the height the upper portion 32 of the space frame 18 extends over the cargo element 14. Therefore, the space frame 18 may increase the cargo capacity of the trailer 12 compared to other trailers while remaining within the regulatory dimension limits.

Furthermore, spreading the structure of the trailer 12 (space frame 18) above and below the cargo element 14 may improve the rigidity of the trailer 12 and optimize the way trailer material is used to support the cargo load. This increased stability keeps the trailer 12 from flexing too much as it travels down the road. The space frame 18 enables a relatively rigid trailer structure using less material than would be necessary for a similarly rigid structure without a space frame extending above the cargo. Thus, the space frame 18 may increase the trailer rigidity while minimizing or reducing overall trailer weight. The amount of weight that is removed from the trailer structure 12 may then be shifted to the cargo element 14, while keeping the weight of the entire system (trailer 12 and cargo 14) within legal road limits. This may be particularly useful in instances where several trailers 12 are needed to deliver the same type of cargo 14 to a location. By increasing the cargo capacity and weight of the cargo, the disclosed trailer design may necessitate fewer trips to a location to deliver the same total amount of cargo.

Embodiments disclosed herein include:

A. A transportation trailer including a space frame, a trailer hookup disposed at a first longitudinal end of the space frame, and a plurality of wheels disposed at a second end of the space frame opposite the first end. The space frame includes a lower central portion for directly supporting cargo thereon, lower side portions coupled to and extending longitudinally outward from the lower central portion on both sides of the space frame, and an upper portion extending upward from the lower side portions to a location above a maximum height of the cargo.

B. A system including a transportation trailer having a space frame coupled to a trailer hookup and a plurality of wheels. The space frame includes a lower central portion, lower side portions coupled to and extending longitudinally outward from the lower central portion on both sides of the space frame, and an upper portion extending upward from the lower side portions to a position above the lower central portion. The system also includes a cargo element to be transported on the transportation trailer. The cargo element is disposed directly on and supported by the lower central portion of the space frame, and the upper portion of the space frame extends to a position above a height of the cargo element when the cargo element is disposed on the lower central portion of the space frame.

C. A method including providing a transportation trailer including a space frame. The space frame includes a lower central portion, lower side portions coupled to and extending longitudinally outward from the lower central portion on both sides of the space frame, and an upper portion extending upward from the lower side portions to a position above the lower central portion. The method also includes loading a cargo element onto the transportation trailer such that the cargo element is disposed directly onto the lower central portion of the space frame, and supporting the cargo element via the space frame. The upper portion of the space frame extends above a height of the cargo element. The method further includes transporting the cargo element via the transportation trailer.

Each of the embodiments A, B, and C may have one or more of the following additional elements in combination: Element 1: wherein a ground clearance of the lower central portion of the space frame is less than a ground clearance of the lower side portions of the space frame. Element 2: wherein the space frame includes a truss structure connecting the lower central portion to the upper portion of the space frame. Element 3: wherein an opening is formed on at least one side of the space frame to enable movement of cargo onto the transportation trailer from a side of the transportation trailer. Element 4: wherein the space frame includes a removable truss section disposed over the opening on the at least one side of the space frame. Element 5: wherein the space frame further includes downwardly sloping portions coupled to opposite sides of the upper portion and sloping downwardly and in opposite directions away from the upper portion to connect the upper portion to the lower side portions of the space frame. Element 6: wherein the lower central portion of the space frame includes a plurality of iso locks for selectively coupling the cargo to the space frame.

Element 7: wherein a bottom surface of the cargo element is supported by the lower central portion of the space frame at a position that is below the top surfaces of the lower side portions of the space frame. Element 8: wherein the cargo element includes a single, dense load disposed on the lower central portion of the space frame. Element 9: wherein the cargo element includes a container holding bulk material. Element 10: wherein the lower central portion of the space frame includes a plurality of iso locks, and wherein the cargo element is selectively coupled to the space frame via the plurality of iso locks. Element 11: wherein the cargo element further includes forklift pockets formed therein to facilitate lifting of the cargo element relative to the transportation trailer. Element 12: wherein the space frame includes a truss structure connecting the lower central portion to the upper portion of the space frame. Element 13: wherein the space frame further includes downwardly sloping portions coupled to opposite sides of the upper portion and sloping downwardly and in opposite directions away from the upper portion to connect the upper portion to the lower side portions of the space frame.

Element 14: further including loading the cargo element onto the transportation trailer using a forklift. Element 15: further including loading the cargo element onto the transportation trailer from a side of the transportation trailer through an opening in the space frame, wherein the space frame includes a truss structure extending between the lower central portion and the upper portion of the space frame. Element 16: further including removing a truss section from the space frame to expose the opening. Element 17: further including locking the cargo element onto the transportation trailer via iso locks disposed on the lower central portion of the space frame.

Although the present disclosure and its advantages have been described in detail, it should be understood that various changes, substitutions and alterations can be made herein without departing from the spirit and scope of the disclosure as defined by the following claims.

What is claimed is:

1. A transportation trailer, comprising:
a space frame;

a trailer hookup disposed at a first longitudinal end of the space frame; and a plurality of wheels disposed at a second end of the space frame opposite the first end;

wherein the space frame comprises:

a lower central portion for directly supporting cargo thereon;

lower side portions coupled to and extending longitudinally outward from the lower central portion on both sides of the space frame;

an upper portion extending upward from the lower side portions to a location above a maximum height of the cargo; and downwardly sloping portions coupled to opposite sides of the upper portion and sloping downwardly and in opposite directions away from the upper portion to connect the upper portion to the lower side portions of the space frame.

2. The transportation trailer of claim 1, wherein a ground clearance of the lower central portion of the space frame is less than a ground clearance of the lower side portions of the space frame.

3. The transportation trailer of claim 1, wherein the space frame comprises a truss structure connecting the lower central portion to the upper portion of the space frame.

4. The transportation trailer of claim 3, wherein an opening is formed on at least one side of the space frame to enable movement of cargo onto the transportation trailer from a side of the transportation trailer.

5. The transportation trailer of claim 4, wherein the space frame comprises a removable truss section disposed over the opening on the at least one side of the space frame.

6. The transportation trailer of claim 1, wherein the lower central portion of the space frame comprises a plurality of iso locks for selectively coupling the cargo to the space frame.

7. A system, comprising:

a transportation trailer having a space frame coupled to a trailer hookup and a plurality of wheels, wherein the space frame comprises:

a lower central portion;

lower side portions coupled to and extending longitudinally outward from the lower central portion on both sides of the space frame;

an upper portion extending upward from the lower side portions to a position above the lower central portion; and downwardly sloping portions coupled to opposite sides of the upper portion and sloping downwardly and in opposite directions away from the upper portion to connect the upper portion to the lower side portions of the space frame; and a cargo element to be transported on the transportation trailer, wherein the cargo element is disposed directly on and supported by the lower central portion of the space frame, and wherein the upper portion of the space frame extends to a position above a height of the cargo element when the cargo element is disposed on the lower central portion of the space frame.

8. The system of claim 7, wherein a bottom surface of the cargo element is supported by the lower central portion of the space frame at a position that is below the top surfaces of the lower side portions of the space frame.

9. The system of claim 7, wherein the cargo element comprises a single, dense load disposed on the lower central portion of the space frame.

10. The system of claim 9, wherein the cargo element comprises a container holding bulk material.

11. The system of claim 7, wherein the lower central portion of the space frame comprises a plurality of iso locks, and wherein the cargo element is selectively coupled to the space frame via the plurality of iso locks.

12. The system of claim 7, wherein the cargo element further comprises forklift pockets formed therein to facilitate lifting of the cargo element relative to the transportation trailer.

13. The system of claim 7, wherein the space frame comprises a truss structure connecting the lower central portion to the upper portion of the space frame.

14. The system of claim 13, wherein an opening is formed on at least one side of the space frame to enable movement of the cargo element onto the transportation trailer from a side of the transportation trailer.

15. The system of claim 14, wherein the space frame comprises a removable truss section disposed over the opening on the at least one side of the space frame.

16. A method, comprising:

providing a transportation trailer comprising a space frame, wherein the space frame comprises:

a lower central portion;

lower side portions coupled to and extending longitudinally outward from the lower central portion on both sides of the space frame;

an upper portion extending upward from the lower side portions to a position above the lower central portion; and downwardly sloping portions coupled to opposite sides of the upper portion and sloping downwardly and in opposite directions away from the upper portion to connect the upper portion to the lower side portions of the space frame;

loading a cargo element onto the transportation trailer such that the cargo element is disposed directly onto the lower central portion of the space frame;

supporting the cargo element via the space frame, wherein the upper portion of the space frame extends above a height of the cargo element; and transporting the cargo element via the transportation trailer.

17. The method of claim 16, further comprising loading the cargo element onto the transportation trailer using a forklift.

18. The method of claim 16, further comprising loading the cargo element onto the transportation trailer from a side of the transportation trailer through an opening in the space frame, wherein the space frame comprises a truss structure extending between the lower central portion and the upper portion of the space frame.

19. The method of claim 18, further comprising removing a truss section from the space frame to expose the opening.

20. The method of claim 16, further comprising locking the cargo element onto the transportation trailer via iso locks disposed on the lower central portion of the space frame.

* * * * *